US011520712B2

(12) United States Patent
Ellis et al.

(10) Patent No.: US 11,520,712 B2
(45) Date of Patent: *Dec. 6, 2022

(54) HIGH-PERFORMANCE WIRELESS SIDE CHANNEL

(71) Applicant: DISPLAYLINK (UK) LIMITED, Cambridge (GB)

(72) Inventors: Daniel Ellis, Cambridge (GB); Timothy Mark Edmonds, Castelnau-le-Lez (FR)

(73) Assignee: DISPLAYLINK (UK) LIMITED, Cambridge (GB)

( * ) Notice: Subject to any disclaimer, the term of this patent is extended or adjusted under 35 U.S.C. 154(b) by 63 days.

This patent is subject to a terminal disclaimer.

(21) Appl. No.: 17/157,921

(22) Filed: Jan. 25, 2021

(65) Prior Publication Data

US 2021/0149826 A1 May 20, 2021

Related U.S. Application Data

(63) Continuation of application No. 15/763,436, filed as application No. PCT/GB2016/053227 on Oct. 18, 2016, now Pat. No. 10,901,921.

(30) Foreign Application Priority Data

Oct. 27, 2015 (GB) ...................................... 1518976

(51) Int. Cl.
*G06F 13/10* (2006.01)
*H04M 1/72415* (2021.01)
(Continued)

(52) U.S. Cl.
CPC .......... *G06F 13/102* (2013.01); *G06F 13/382* (2013.01); *G06F 13/4282* (2013.01); *H04M 1/72415* (2021.01); *H04W 12/08* (2013.01)

(58) Field of Classification Search
CPC ..................................................... G06Q 10/00
See application file for complete search history.

(56) References Cited

U.S. PATENT DOCUMENTS 7,885,639 B1 * 2/2011 Satish ................. H04W 12/122
455/410
9,246,872 B2 1/2016 Skog
(Continued)

FOREIGN PATENT DOCUMENTS

WO 2006/018713 A1 2/2006
WO 2014/057465 A1 4/2014
(Continued)

OTHER PUBLICATIONS

Anonymous, "Wi-Fi Display Technical Specification Version 1.1", 151 pages [online], [retrieved on Jan. 5, 2016]. Retrieved from the Internet: <URL: httos://www.wi-fi.ora/discover-wi-fi/soecifications>.

*Primary Examiner* — Henry Tsai
*Assistant Examiner* — Juanito C Borromeo
(74) *Attorney, Agent, or Firm* — Paradice & Li LLP

(57) ABSTRACT

Systems and methods of controlling a docking station comprise establishing, by the wireless access point, a USB connection tunnelled over a local area wireless network connection with the mobile device, receiving, by the wireless access point over the USB connection, a request for an Internet Protocol (IP) or a Media Access Control (MAC) network address of the display controller, transmitting, by the wireless access point in response to the request, the IP or the MAC network address of the display controller to the mobile device over the USB connection, and receiving, by the wireless access point, the at least video data addressed to the IP or the MAC network address of the display controller and switching the at least video data addressed to the IP or the MAC network address of the display controller directly (Continued)

to the display controller without passing via the USB controller.

20 Claims, 4 Drawing Sheets

(51) Int. Cl.
*G06F 13/38* (2006.01)
*G06F 13/42* (2006.01)
*H04W 12/08* (2021.01)

(56) References Cited

U.S. PATENT DOCUMENTS

2005/0246470 A1* 11/2005 Brenner ............... G06F 1/1632
710/303
2014/0095755 A1   4/2014 Gao et al.

FOREIGN PATENT DOCUMENTS

WO   2015/104227 A1   7/2015
WO   2016/167509 A1   10/2016

* cited by examiner

HIGH-PERFORMANCE WIRELESS SIDE CHANNEL

CROSS-REFERENCE TO RELATED APPLICATIONS

This application is a continuation of U.S. application Ser. No. 15/763,436, filed Mar. 26, 2018, titled "High-Performance Wireless Side Channel," which was filed as a U.S. national stage application under 35 U.S.C. § 371 of International Patent Application No. PCT/GB2016/053227, filed on Oct. 18, 2016, which claims the benefit of Great Britain Patent Application No. 1518976.4, filed on Oct. 27, 2015, the contents of each of which are incorporated herein by reference in their entirety.

BACKGROUND

As mobile devices such as laptops, tablet computers and even smartphones become more powerful and more popular, it is becoming common to connect them to docking stations in order to take advantage of the provision of peripherals such as display devices and user input devices. The use of a docking station not only makes connection more convenient, but also means that multiple peripherals can be connected when many smaller mobile devices only have a single connection point.

As mobile devices become still smaller, the need for such a connection point introduces problems as it is a weakness in the outer case of the device. This means that it is desirable for the mobile device and the docking station to connect to one another wirelessly. This may be done through a general-purpose wireless network connection, which is useful because it takes advantage of a connection method that is likely to be present on the mobile device for the purpose of internet access.

Unfortunately, conventional docking stations and mobile devices are arranged to handle methods of local communication, especially USB, and it is therefore necessary for the data to be formatted using one of these methods and then transported in wireless network frames in a method known as tunnelling. This is inefficient, especially for high-volume data that must be transmitted at considerable speed, such as video or audio data, as it is then necessary to convert the data back from the network format to the local format upon receiving it.

The invention aims to solve or at least mitigate this problem.

SUMMARY

Accordingly, in a first aspect, the invention provides a method of controlling a docking station, the docking station comprising a wireless access point having a network address for communicating with a mobile device over a local area wireless network connection, a display controller having a network address, the display controller being configured to process at least video data for output to at least one display device over a display-specific connection, and a Universal Serial Bus, USB, controller configured to process at least USB data signals for output to one or more peripheral devices over a USB connection, the method comprising:

communicating by the access point with a mobile device over the local area wireless network to establish a local area wireless network connection with the mobile device;

communicating by the access point with the mobile device to establish a USB connection tunnelled over the local area wireless network connection with the mobile device;

receiving, by the access point over the USB connection from the mobile device, a request for the network address of the display controller;

transmitting, by the access point in response to the request, the network address of the display controller to the mobile device over the USB connection, thereby allowing the mobile device to transmit at least video data over the local area wireless network connection addressed to the display controller using the network address of the display controller without using the USB connection;

receiving, at the access point, at least USB data signals and switching the at least USB data signals to the USB controller for processing and output to one or more peripheral devices connected to the docking station; and receiving, at the access point, at least video data addressed to the network address of the display controller and switching the at least video data addressed to the network address of the display controller directly to the display controller without passing via the USB controller.

In one embodiment, the local area wireless network is a Wireless Local Area Network (WLAN), which may be Wi-Fi and the local format is USB. This is preferable because these are common networking and connection methods between devices. Alternatively, the local area wireless network may be an LTE-U connection or a local small cell cellular connection, such as one using femtocells, picocells and/or microcells, or any other analogous local wireless connection.

This method is beneficial because it means that the wireless network, which may be Internet Protocol (IP), based, can be used as a side channel to carry data that would otherwise need to be tunnelled. This is faster and more efficient.

According to a second aspect, the invention provides a method of controlling a mobile device for transmitting at least video data and USB data to a docking station, the docking station comprising a wireless access point having a network address for communicating with the mobile device over a local area wireless network connection, a display controller having a network address, the display controller being configured to process at least the video data for output to at least one display device over a display-specific connection, and a Universal Serial Bus, USB, controller configured to process at least the USB data signals for output to one or more peripheral devices over a USB connection, the method comprising:

communicating by the mobile device with the access point over the local area wireless network to establish a local area wireless network connection with the access point;

communicating by the mobile device with the access point to establish a USB connection tunnelled over the local area wireless network connection with the access point;

transmitting, by the mobile device over the USB connection to the access point, a request for the network address of the display controller;

receiving, by the mobile device, the network address of the display controller over the USB connection;

transmitting, by the mobile device, at least video data over the local area wireless network connection addressed to the display controller using the network address of the display controller without using the USB connection; and transmitting, by the mobile device, at least USB data signals over the USB connection.

In one embodiment, the mobile device always queries for a network address (such as an IP address). This is preferable because it means that there will be no need for monitoring equipment and additional signalling. Alternatively, the mobile device may only query for a network address in certain circumstances, such as when it is sending above a pre-programmed level of a particular type of data.

In another embodiment, some data is still sent in tunnelled form and only data for which low latency is important is sent in a network format. This means that use of resources in the docking station will be more even as data will be travelling down two paths rather than only one.

In one embodiment, the request is only transmitted if the mobile device has an amount of video data to transmit that is above a certain threshold of required quality of service.

The local area wireless network may be a Wireless Local Area Network (WLAN), which may be a Wi-Fi connection, and the network address may be either a Media Access Control, MAC, address or an Internet Protocol, IP, address. Alternatively, the local area wireless network may be an LTE-U connection or a local small cell cellular connection, such as one using femtocells, picocells and/or microcells, or any other analogous local wireless connection.

In one embodiment, USB control signals are also transmitted or received over the USB connection. Audio signals may be transmitted or received over the USB connection. In an embodiment, audio signals are transmitted or received over the wireless LAN connection using the network address of the display controller, the display controller being configured to process the audio signals for output to the display device or to an audio device. Alternatively, audio signals are transmitted or received over the wireless LAN connection using a network address of an audio controller of the docking station, the audio controller being configured to process the audio signals for output to an audio device.

According to a further aspect, the invention provides a docking station comprising:

a wireless access point having a network address for communicating with a mobile device over a local area wireless network connection;

a display controller having a network address, the display controller being configured to process at least video data for output to at least one display device over a display-specific connection; and a Universal Serial Bus, USB, controller configured to process at least USB data signals for output to one or more peripheral devices over a USB connection;

wherein the docking station is configured to perform the method as described above.

In an embodiment, the docking station has or is capable of generating an IP address and is able to send it to a connected mobile device in order to allow data to be transmitted to it outside the tunnel. It also may have a fast path from an access point which controls the network input and output directly to any processor or further input or output engine. This fast path can carry data in network format as it is received from the wireless connection or in a second network format to which received data can be easily converted.

This allows the method to work most effectively as the fast path can be used to transport data directly in network format, bypassing the requirement for time-consuming conversion.

Overall, the invention allows discovery via an initial USB connection without requiring an IP address to be hard-wired into the mobile device, while providing the speed of an IP connection where it is required.

BRIEF DESCRIPTION OF THE DRAWINGS

Embodiments of the invention will now be more fully described, by way of example, with reference to the drawings, of which.

DETAILED DESCRIPTION OF THE DRAWINGS

Figure 1:
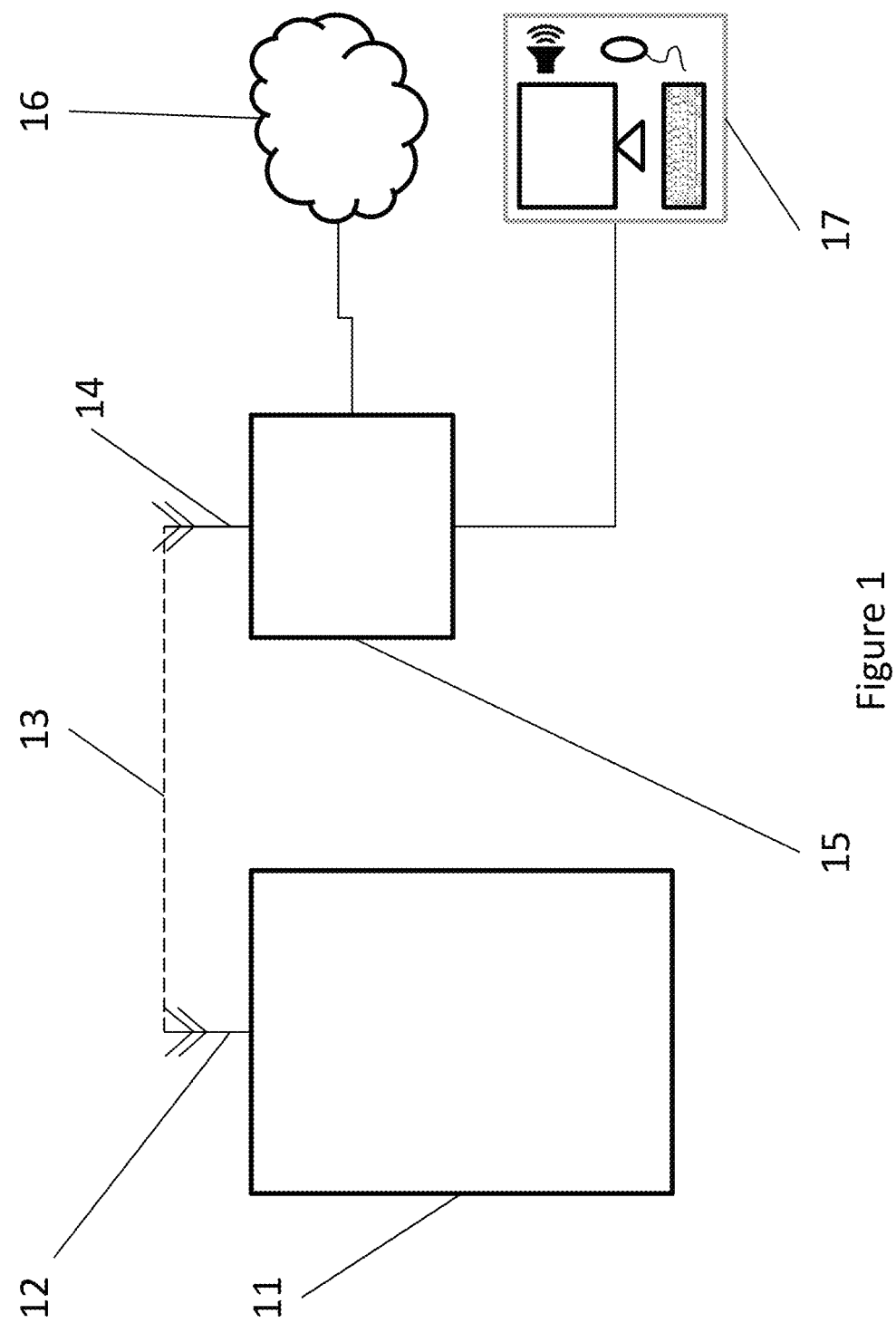
FIG. 1 shows a system comprising a mobile device connected to a docking station via a wireless connection.

FIG. 1 shows a mobile device [11] with an antenna [12], which is connected wirelessly to a docking station [15] which is also provided with an antenna [14]. In practice, the antennae [12, 14] are likely to be integral to the devices [11, 15], but they are shown here as separate for clarity. The wireless connection [13] may be over any suitable general-purpose wireless connection medium, such as a wireless LAN, which, in this embodiment, is Wi-Fi.

The docking station [15] is also connected to a one or more peripherals [17] and a network [16]. It is likely that the connection to the network [16] will be wired, in this embodiment through an Ethernet cable, and the Wi-Fi connection [13] will be available for the use of the connection to the mobile device [11]. The peripherals [17] may include a display device, an audio output device, a keyboard and a mouse. They are shown and referred to by a single reference number for convenience.

Figure 2:
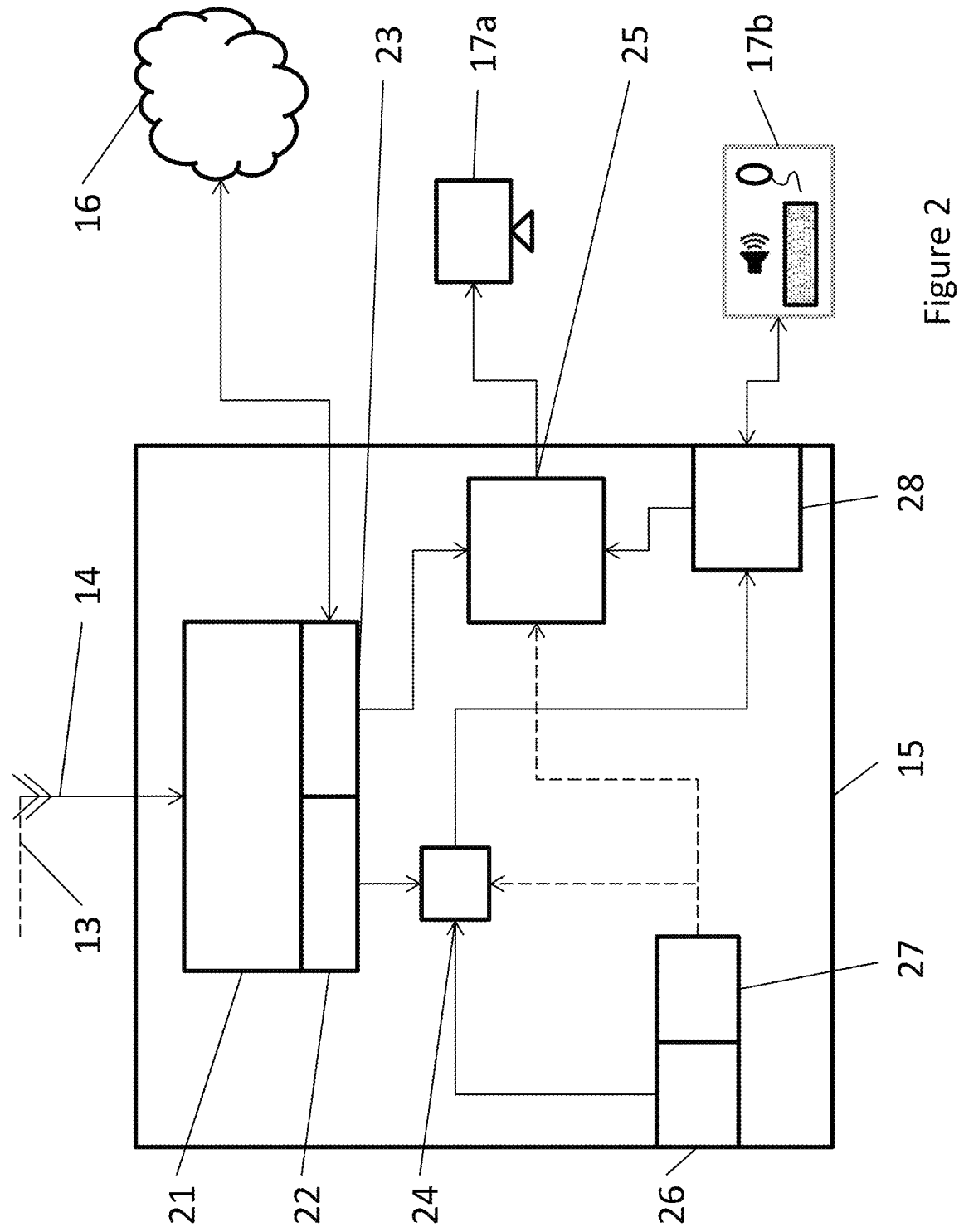
FIG. 2 shows a first embodiment of a docking station according to the invention.

FIG. 2 shows a more detailed schematic of the docking station [15], showing some of the internal components. There may be other components, depending on the exact embodiment, but these are not important to the invention and so are not shown here. FIG. 2 also shows the docking station's [15] connections to the mobile device [11], display device [17a], network [16], and other peripherals [17b]. This includes the antenna [14], which is shown externally as previously described and is used to receive and transmit wireless signals [13] between the docking station [15] and the mobile device [11]. Internally, the docking station [15] contains an access point [21], which acts as a controller and signal processor for both the Wi-Fi connection [13] and the wired Ethernet connection to the network [16]. Accordingly, it is connected to the antenna [14], as well as a USB host [22] and an Ethernet connection [23]. It also has a network address which will allow it to communicate with the mobile device [11] over a network connection such as the Wi-Fi connection [13]. This address may be either a MAC address or an IP address, depending on the embodiment, or it may be another type of network address, as appropriate. In this example, the address is an IP address.

The Ethernet connection [23] is in turn connected to the external network [16] as previously mentioned and can be used to pass generic network data between the network [16] and the mobile device [11].

The USB host [22] is responsible for receiving tunnelled data and is connected to the upstream port of a USB controller [28] so that the USB controller [28] believes that it is connected directly to the mobile device [11] via USB. The docking station [15] also has an actual upstream port [26] for USB input so that, if desired, the mobile device [11] could be connected directly to the docking station [15]. Both the wired USB input [26] and the wireless USB input [22]

are connected to a switch [24] which dictates which signal is sent to the USB controller [28]; the USB controller [28] is not aware of the actual source of the USB data. The switch [24] is controlled by a plug detector [27] connected to the wired USB input [26]. When a USB cable is plugged in, it triggers a positive signal in the plug detector [27] which is sent to the switch [24] and the input from the wired USB connection [26] is then used. Otherwise, the signal from the wireless USB connection [22] is used.

The docking station [15] further contains a display controller [25], which in this embodiment carries out image and display processing on video data received from the mobile device [11] for output to a display device [17a]. This processing is likely to include conversion to a display-specific format, as the connection between the display device [17a] and the docking station [15] will be display-specific. The display controller [25] can either receive input from the USB controller [28], or directly from the Ethernet connection [23], and as such it has a network address which it is capable of supplying upon receiving a request from the mobile device [11]. The address may be either a MAC address or an IP address depending on the embodiment, or it may be another type of network address as appropriate. In this example, the address is an IP address.

The mobile device [11] will, in this embodiment, request a network address and therefore the signal from the plug detector [27] also acts as an indication to the display controller [25] of which input it should use: the input from the USB host [22] transported via the USB controller [28] or the input received directly from the Ethernet connection [23].

In another embodiment, if a mobile device [11] is connected that does not request a network address for the display controller, it will not be apparent whether the mobile device is capable of operating according to this embodiment of the invention. In this case, there may be a further or alternative signalling connection from the access point [21] to the display controller [25] to indicate whether wireless data is being supplied as Ethernet or tunnelled.

Externally, the display controller [25] is connected directly to the display device [17a]. The other peripherals [17b] are connected to the USB controller [28].

Some display devices have integral speakers and in this situation it may be appropriate to direct audio data as well as display data through the display controller [25]. In this case, audio data may be transmitted via USB tunnelling and then directed to the display controller [25] in the conventional way, or the methods of the invention may also be used to transmit audio data directly to the display controller [25] as network data. In either case, in such an embodiment the display controller [25] will also be configured to process audio data and transmit it to the connected speakers.

Figure 3:
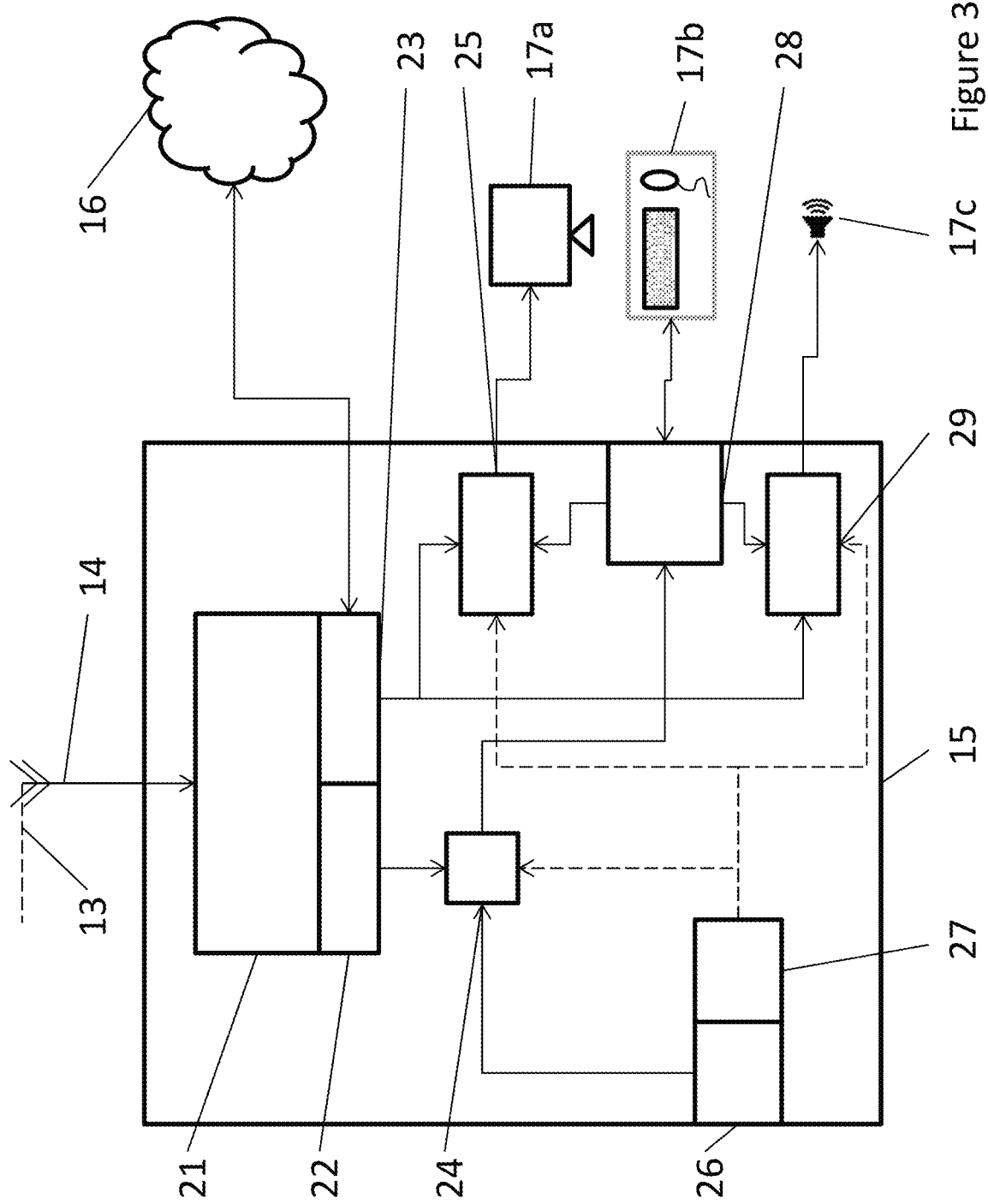
FIG. 3 shows a second embodiment of a docking station according to the invention.

FIG. 3 shows an embodiment of the docking station that is almost identical to that shown in FIG. 2. However, as well as all the components previously described, which behave in the same way as previously described, this embodiment includes a separate audio controller [29]. This will perform any required processing of audio data to prepare it for output to external speakers [17c]. Like the display controller [25], it has a unique network address, which may be an IP address, MAC address or any other suitable network address. It is also connected to the plug detector [27], USB controller [28], and Ethernet connection [23] in the same way as the display controller [25].

Figure 4:
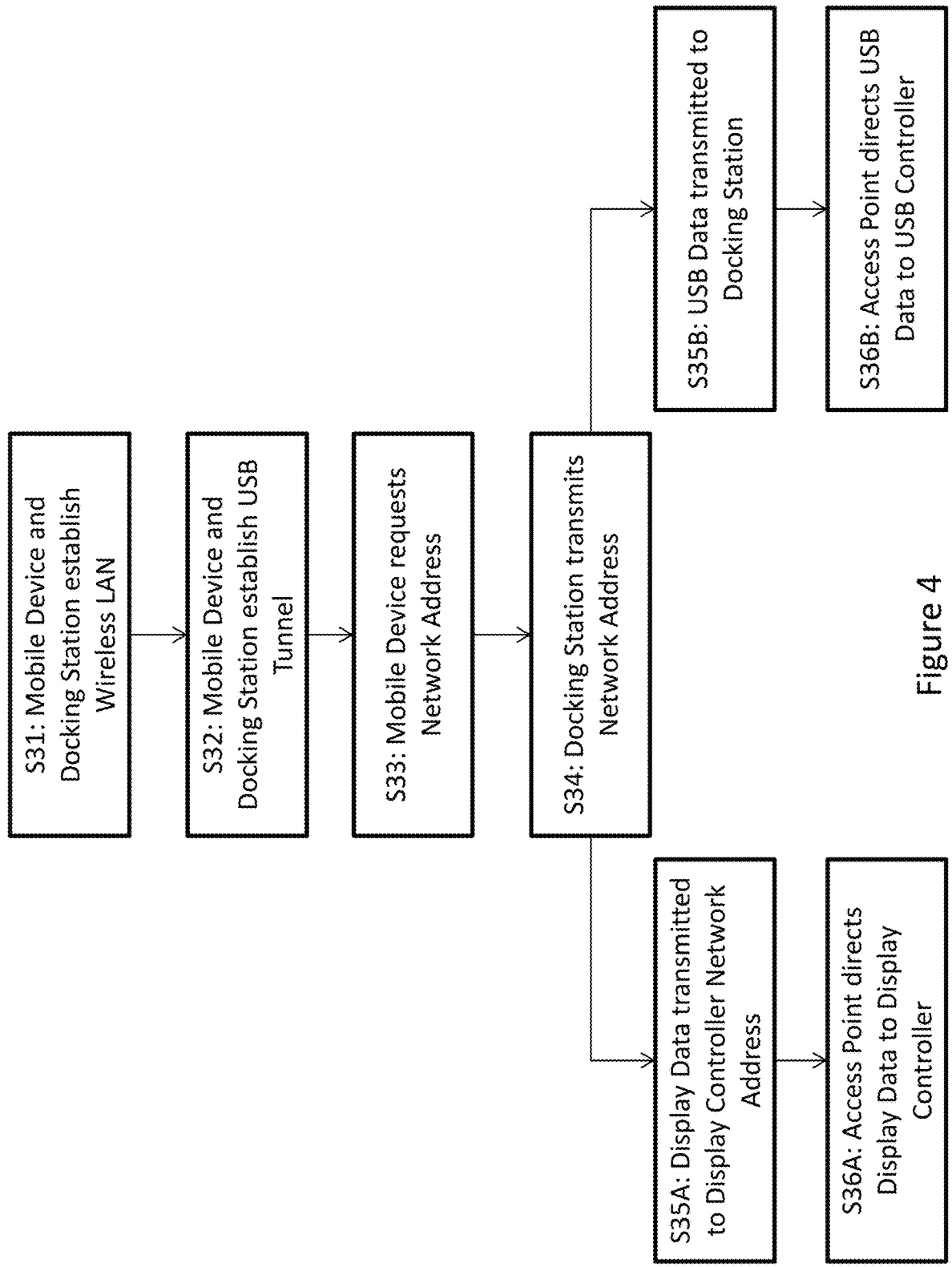
FIG. 4 shows a process of operation of the docking station of FIG. 2.

FIG. 4 illustrates the process followed by a mobile device [11], in this case a smartphone, and a docking station [15], according to an embodiment of the invention.

At Step S31, the mobile device, which may be a smartphone [11], is connected wirelessly to the docking station [15]. In this embodiment, the two devices [11, 15] will follow the usual connection method associated with Wi-Fi in order to establish a wireless LAN connection [13] and furthermore, at Step S32, the smartphone [11] and the access point [21] on the docking station [15] will communicate with each other to begin tunnelling USB data and control signals. This means that the smartphone [11] is configured to package USB signals as Wi-Fi signals so that they can be sent over the Wi-Fi connection [13], passed to the USB controller [28] through the switch [24] and processed as if they were USB signals. The display controller [25] is aware that the connection is wireless as it does not receive a signal from the plug detector [27].

This may not always be very efficient, however, as it requires considerably more processing for the access point [21] on the docking station [15] to pass USB tunnelled data to the display controller [25] due to the involvement of the USB controller [28]. This is especially problematic in the case of display data, which is likely to be high-volume and require low-latency transmission.

Therefore, at Step S33, the smartphone [11] will also use the USB tunnel to transmit a request to the access point [21] for the IP address of the display controller [25] so that it can transmit display data directly to this network address.

At this stage, if there are other controllers or engines which may have their own network addresses, such as the audio controller [29] shown in FIG. 3, it may also query the access point [21] for these addresses. In this case, the Ethernet connection [23] would then direct different types of incoming data to the correct locations.

In this embodiment, this happens every time the mobile device is connected to the access point, as this will require less monitoring and therefore require less processing power to put the side channel in place as quickly as possible.

However, in some embodiments it may be possible for either the smartphone [11] or the docking station [15] to have a method of detecting quality of service. This may be measured as bandwidth used versus bandwidth available, or simply by the proportions of different types of data being sent through the connection [13]. Under these circumstances, the smartphone [11] could be arranged to only query for an IP address when whichever quality of service measure is in use passes a particular threshold.

The access point receives the request and signals the display controller [25] to supply an IP address. This may be one built in or it may generate it on demand. In either case, though, it does not need to be known to the smartphone [11] at the beginning of the process, which is therefore an improvement on conventional behaviour. At Step S34, the docking controller [25] supplies its IP address to the access point [21], which transmits it to the smartphone [11] through the USB tunnel.

Once the address has been received, the smartphone [11] is able to transmit data directly to it across the wireless LAN connection [13] in Wi-Fi frames as if it were a network destination (Step S35A). Depending on the exact embodiment, the smartphone [11] may transmit only display data in this way, or it may transmit display and audio data to the display controller [25], using its IP address as supplied, or it may transmit display data to the display controller [25] and audio data to the audio controller [29] using their respective addresses. It does not use USB tunnelling, although this may continue to be used for other peripherals [17b] and control signals. As such, at Step S35B the smartphone [11] transmits other USB signals via USB tunnelling as before.

At Step S36A, the access point [21] on the docking station [15] receives the Wi-Fi data from the smartphone [11]. Since this is sent as ordinary network data, the access point passes it to the Ethernet connection [23] rather than the USB host [22] as it would if it were tunnelled. The IP address supplied by the display controller [25] is specific to the display controller [25], so data sent to that address can be directed straight to the display controller [25]. The same will be true of an IP address supplied by an audio controller [29].

As a result, the data is received by the access point [21] and passed to the display controller [25] directly by the Ethernet connection [23] after removal of the Wi-Fi packaging such as packet headers. This is significantly faster and more efficient than using USB tunnelling and passing the data through the USB controller [28]. It also allows a greater volume of data to be passed as USB data transmitted using USB tunnelling is limited in bandwidth. Meanwhile, other data can continue to use USB tunnelling as before and will be directed to the USB Controller at Step S36B.

Finally, the data received by the display controller [25] is processed as appropriate and transmitted to the display device [17a] for display in the conventional way. Likewise, audio data will be processed and transmitted to the speaker [17c] to be played in the conventional way.

Although particular embodiments have been described in detail above, it will be appreciated that various changes, modifications and improvements can be made by a person skilled in the art without departing from the scope of the present invention as defined in the claims. For example, hardware aspects may be implemented as software where appropriate and vice versa, and engines/modules which are described as separate may be combined into single engines/modules and vice versa. Functionality of the engines or other modules may be embodied in one or more hardware processing device(s) e.g. processors and/or in one or more software modules, or in any appropriate combination of hardware devices and software modules. Furthermore, software instructions to implement the described methods may be provided on a computer readable medium.

Furthermore, although the local area wireless network has been described as a wireless LAN, WLAN, such as a Wi-Fi network, it could be is an LTE-U connection or a local cellular connection or any other analogous connection. LTE-U is a proposal for the use of the 4G Long Term Evolution (LTE) radio communications technology in unlicensed (U) spectrum, such as the 5 GHz band used by dual-band Wi-Fi equipment. It may then serve as an alternative to carrier-owned Wi-Fi hotspots. Alternatively, other local network connections, such as cellular small cell networks, for example, femtocells, picocells or even microcells, could be used.

What is claimed is:

1. A method of controlling a docking station, the docking station comprising a wireless access point for communicating with a mobile device, a display controller configured to process at least video data, and a Universal Serial Bus (USB) controller, the method comprising:
    establishing, by the wireless access point, a USB connection tunnelled over a local area wireless network connection with the mobile device;
    receiving, by the wireless access point over the USB connection, a request for an Internet Protocol (IP) or a Media Access Control (MAC) network address of the display controller;
    transmitting, by the wireless access point in response to the request, the IP or the MAC network address of the display controller to the mobile device over the USB connection; and
    receiving, by the wireless access point, the at least video data addressed to the IP or the MAC network address of the display controller and switching the at least video data addressed to the IP or the MAC network address of the display controller directly to the display controller without passing via the USB controller.

2. The method of claim 1, wherein the wireless access point has a network address for communicating with the mobile device over the local area wireless network connection, the network address of the wireless access point being different from the IP or the MAC network address of the display controller.

3. The method of claim 1, wherein the local area wireless network connection is a Wireless Local Area Network (WLAN) connection, an LTE-U connection, a local cell cellular connection, or any other analogous local wireless connection.

4. The method of claim 1, wherein the display controller is configured to process the at least video data for output to at least one display device over a display-specific connection and the at least video data requires low-latency transmission.

5. The method of claim 1, further comprising:
    receiving, by the wireless access point over the USB connection, at least USB data signals from the mobile device and switching the at least USB data signals to the USB controller for processing and outputting to one or more peripheral devices over the USB connection.

6. The method of claim 1, wherein USB control signals or audio signals are transmitted or received over the USB connection.

7. The method of claim 1, wherein audio signals are transmitted or received over the local area wireless network connection using the IP or the MAC network address of the display controller, the display controller being configured to process the audio signals for output to at least one display device or to an audio device.

8. The method of claim 1, wherein audio signals are transmitted or received over the local area wireless network connection using a network address of an audio controller of the docking station, the audio controller being configured to process the audio signals for output to an audio device.

9. The docking station configured to perform the method of claim 1, comprising:
    the wireless access point for communicating with the mobile device;
    the display controller configured to process the at least video data for output to at least one display device over a display-specific connection; and
    the USB controller configured to process at least USB data signals for output to one or more peripheral devices over the USB connection.

10. A method of controlling a mobile device for transmitting at least video data and USB data to a docking station, the docking station comprising a wireless access point for communicating with the mobile device, a display controller configured to process at least video data, and a Universal Serial Bus (USB) controller, the method comprising:
    communicating, by the mobile device via a USB connection tunnelled over a local area wireless network connection, with the wireless access point;
    transmitting, by the mobile device over the USB connection to the wireless access point, a request for an Internet Protocol (IP) or a Media Access Control (MAC) network address of the display controller;

receiving, by the mobile device, the IP or the MAC network address of the display controller in response to the request; and transmitting, by the mobile device, the at least video data over the local area wireless network connection addressed to the display controller using the IP or the MAC network address of the display controller without using the USB connection.

11. The method of claim 10, further comprising:
transmitting, by the mobile device over the USB connection, at least USB data signals to the USB controller.

12. The method of claim 10, wherein the request is transmitted in response to an amount of video data to be transmitted from the mobile device being above a threshold quality of service.

13. The method of claim 12, wherein the threshold quality of service is determined based on bandwidth used versus bandwidth available, or by proportions of different types of data being sent over the USB connection.

14. The method of claim 10, wherein the wireless access point has a network address for communicating with the mobile device over the local area wireless network connection, the network address of the wireless access point being different from the IP or the MAC network address of the display controller.

15. The method of claim 10, wherein audio signals are transmitted or received over the local area wireless network connection using 1) the IP or the MAC network address of the display controller, the display controller being configured to process the audio signals for output to at least one display device or to an audio device, or 2) using a network address of an audio controller of the docking station, the audio controller being configured to process the audio signals for output to the audio device.

16. A docking station comprising:
a display controller configured to process at least video data;
a Universal Serial Bus (USB) controller; and
a wireless access point configured to communicate with a mobile device, including:
transmitting an Internet Protocol (IP) or a Media Access Control (MAC) network address of the display controller to the mobile device;
receiving the at least video data addressed to the IP or the MAC network address of the display controller over a USB connection tunnelled over a local area wireless network connection; and
switching the at least video data addressed to the IP or the MAC network address of the display controller directly to the display controller without passing via the USB controller.

17. The docking station of claim 16, wherein the wireless access point is further configured to receive, over the USB connection, at least USB data signals from the mobile device and switch the at least USB data signals to the USB controller, which is further configured to process and output the at least USB data signals to one or more peripheral devices over the USB connection.

18. The docking station of claim 16, wherein audio signals are transmitted or received over the local area wireless network connection using 1) the IP or the MAC network address of the display controller, the display controller being configured to process the audio signals for output to at least one display device or to an audio device, or 2) wherein the docking station further comprises an audio controller configured to process the audio signals for output to the audio device.

19. The docking station of claim 16, wherein the display controller is configured to process the at least video data for output to at least one display device over a display-specific connection and the at least video data requires low-latency transmission.

20. The docking station of claim 16, wherein the transmitting of the IP or the MAC network address of the display controller to the mobile device occurs in response to a request from the mobile device when an amount of video data to be transmitted from the mobile device is above a threshold quality of service.

* * * * *